United States Patent [19]

Dekura et al.

[11] Patent Number: 4,897,211
[45] Date of Patent: Jan. 30, 1990

[54] SYNTHETIC LUBRICANT FOR LUBRICATING THIN FILM AND MAGNETIC RECORDING MEDIUM

[75] Inventors: Takateru Dekura, Kanagawa; Juro Endo, Saitama, both of Japan

[73] Assignees: Hitachi Metals, Ltd.; Maruwa Bussan K. K., both of Tokyo, Japan

[21] Appl. No.: 364,171

[22] Filed: Jun. 12, 1989

Related U.S. Application Data

[62] Division of Ser. No. 136,392, Dec. 22, 1987.

[30] Foreign Application Priority Data

Apr. 16, 1987 [JP] Japan .................................. 62-94121

[51] Int. Cl.$^4$ ............................................ C10M 147/04
[52] U.S. Cl. ........................................ 252/54; 252/58; 428/328; 428/421
[58] Field of Search .................. 428/328, 421; 252/54, 252/58

[56] References Cited

U.S. PATENT DOCUMENTS

| | | |
|---|---|---|
| 3,242,218 | 3/1966 | Miller . |
| 3,505,229 | 4/1970 | Skehan ................................ 252/54 |
| 3,665,041 | 5/1972 | Sianesi et al. . |
| 3,715,378 | 2/1973 | Sianesi et al. . |
| 4,267,238 | 5/1981 | Chernega . |
| 4,268,556 | 5/1981 | Pedrotty . |
| 4,657,687 | 4/1987 | Caporiccio et al. .................. 252/54 |
| 4,724,092 | 2/1988 | Fukui et al. ............................ 252/54 |
| 4,836,944 | 6/1989 | Tohzuka et al. ...................... 252/54 |

OTHER PUBLICATIONS

European Search Report No. EPA-28 874, dated Aug. 30, 1988.
Patent Abstracts of Japan, unexamined applications, P field, vol. 7, No. 130, Jun. 7, 1983, Kokai-No. 58-48 226.
Patent Abstracts of Japan, unexamined applications, P field, vol. 9, No. 6, Jan. 11, 1985, Kokai-No. 59-154 644.
Patent Abstracts of Japan, unexamined applications, P field, vol. 9, No. 6, Jan. 11, 1985, Kokai-No. 58-154 645.

*Primary Examiner*—William R. Dixon, Jr.
*Assistant Examiner*—Miriam Sohn
*Attorney, Agent, or Firm*—Finnegan, Henderson, Farabow, Garrett & Dunner

[57] ABSTRACT

A synthetic lubricant comprising a compound represented by the following general formula (I):

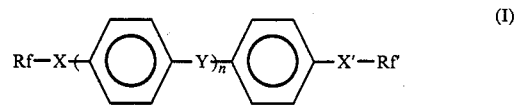

wherein Rf and Rf' represent a fluorine-containing polyoxyalkylene group, X and X' a polar group, Y of one or more selected from the group consisting of methylene, ethylene, propylene, oxygen, ketone, imino, sulfon and sulfur or no atom or group, and n an integer of 0 to 5, and a magnetic recording medium coated with this lubricant.

7 Claims, No Drawings

SYNTHETIC LUBRICANT FOR LUBRICATING THIN FILM AND MAGNETIC RECORDING MEDIUM

This is a division of application Ser. No. 136,392, filed Dec. 22, 1987, pending.

BACKGROUND OF THE INVENTION

1. Field of the Invention

The present invention relates to a synthetic lubricant for lubricating a thin film and a magnetic recording medium and, more particularly, to a synthetic lubricant which is capable of firmly adhering to the surface of the substrate of metal, glass, ceramic, carbon or the like in the form of a thin film and providing it with good lubrication and a magnetic recording medium with a lubricant layer formed thereof by using such a lubricant.

The surface of a magnetic recording medium is coated with a lubricant, because lubrication is required between the magnetic recording medium and a magnetic head which come into contact with each other.

In the case of a thin film magnetic recording medium having a high recording density, a flying head is used as the magnetic head. The flying head is operated in the following manner. The flying head is pressed against the medium by the spring force of a load arm and a gimbal at a force of about 10 gf while the medium is not rotated. When the recording medium starts to rotate, the slider portion (made of MnZn ferrite, $Al_2O_3$-TiC, $ZrO_2$ or $CaTiO_3$) of the flying head slides on the medium, and when the rotation of the medium assumes a normal state (e.g., 3,600 rpm), the flying head floats at a height of 0.15 to 0.5 $\mu$m from the medium on a stream of air which moves together with the rotation of the medium. At this time, the flying head sometimes comes into contact with the surface of the medium due to the vibration applied from the outside or the unevenness of the surface of the medium. When the rotation of the medium is stopped, the flying head gradually approaches the medium and moves on the medium as if to be dragged or stops on the medium while bouncing thereon.

In order to improve the electromagnetic transducing characteristics between a magnetic recording medium and a flying head, it is desirable that the lubricant film applied to the surface of the medium is as thin as possible. When the lubricant film is several hundred Å thick, the flying head adheres to the surface of the medium, in other words, a sticking phenomenon is produced, thereby making it impossible to start to rotate the medium. Thus, it is desirable that the thickness of the lubricant on the surface of the medium is one to several molecular layers.

In order to resist the shock or wear of a flying head by means of the lubricant layer of one to several molecular layers, the lubricant is required not only to be excellent in lubricating properties but also to be firmly absorbed to the metal or carbon of the substrate of the medium.

As the lubricant, perfluoropolyethers are conventionally used and are commercially available as Fomblin produced by Montedison, Italy and Krytox produced by Du Pont, U.S.A. These lubricants are disclosed in U.S. Pat. Nos. 3,242,218, 3,665,041, 3,715,378, etc.

Perfluoropolyethers are high-quality lubricating oils having excellent thermal stability, heat resistance and resistance to chemicals and low evaporation rate. However, they have very low adsorptivity, and when they are applied to the surface of metal, glass, ceramic, carbon or the like into a thickness of one to several molecular layers as a thin film lubricant, they cannot be firmly adsorbed to the surface of metal or the like. They are therefore limited as a lubricant for the above-described magnetic recording medium.

To improve the adsorptivity of a perfluoropolyether lubricant, attempts have been made on firmly adsorbing it to a magnetic recording medium by attaching a polar group to the end of the perfluoropolyoxyalkylene group and increasing the dipole moment of the polar group to a predetermined value or more. These proposals are disclosed in, for example, U.S. Pat. Nos. 4,267,238 and 4,268,556.

In a lubricant having a perfluoropolyoxyalkylene group with a polar group attached to the end thereof, the lubricant is adsorbed to metal or carbon by the polar group and the perfluoropolyoxyalkylene group extending from the polar group provides lubricating properties.

However, such a lubricant cannot satisfy the characteristics required when it is used as a lubricant for a thin film magnetic recording medium because the adsorptivity provided solely by the polar group is insufficient for the following reasons:

(1) A thin film magnetic recording medium is used in a very severe state in which the shock and sliding friction of a magnetic head are applied to the medium.

(2) The surface of the thin film magnetic recording medium is a thin film metal medium layer (e.g., Co-Ni layer) formed by sputtering or plating, or a protective film of carbon, ceramic or the like formed on the thin film metal medium layer. The bonding by the polar group cannot maintain sufficient strength between the lubricant layer and a film of such an inorganic material as metal, carbon and ceramic.

These facts bring about the following problems: the lubricant film formed on the surface of the magnetic recording medium peels off, or the molecules of the lubricant film are flown about or blown to the outer peripheral portion of the medium locally by the centrifugal force applied by the rotation of the magnetic recording medium (the characteristic of a lubricant film which cause these phenomena will be referred to as "migrating characteristic"), thereby making it impossible to maintain the lubricant thin film in a uniform state.

SUMMARY OF THE INVENTION

Accordingly, it is an object of the present invention to eliminate the above-described problems in the prior art and to provide a synthetic thin film lubricant which is capable of firmly adhering to the surface of an inorganic material such as metal, carbon, ceramic, glass in the form of a thin film and providing it with good lubrication.

It is another object of the present invention to provide a synthetic lubricant which has excellent lubricating properties and very high durability and adsorptivity.

It is still another object of the present invention to provide a lubricated magnetic recording medium which exhibits very good resistance to contact-start-stops (CSS) and desirable non-migrating characteristic.

To achieve this aim, the present invention provides a synthetic lubricant comprising a compound represented by the following general formula (I):

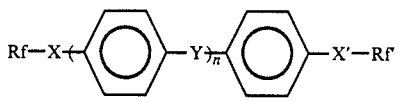  (I)

wherein Rf and Rf' represent a fluorine-containing polyoxyalkylene group, X and X' a polar group, Y is one or more, preferably one, selected from the group consisting of methylene, ethylene, propylene, oxygen, imino, sulfone and sulfur or no atom or group, and n an integer of 0 to 5, and a magnetic recording medium coated with this lubricant.

DESCRIPTION OF THE PREFERRED EMBODIMENTS

The present invention will be explained in detail hereinunder.

A compound contained in a synthetic lubricant for lubricating a thin film according to the present invention is a fluorine-containing alkylpolyether derivative, as represented by the general formula (I), and has a benzene ring and polar groups between two fluorine-containing polyoxyalkylene groups.

In the formula (I), the molecular weight of Rf and Rf' is preferably 1,000 to 50,000 more preferably 1,000 to 15,000. In the compound represented by the formula (I), Rf and Rf' are the portions which control the lubricating properties of the lubricant. If the molecular weight thereof is less than 1,000, the resistance to shock is lowered and the lubricating properties are deteriorated. As the molecular weight of Rf and Rf' increases, the lubricating properties are improved, but if the molecular weight becomes so large as to exceed 50,000, when the lubricant is dissolved in a solvent at the time of coating, it takes the form of an emulsion, thereby making uniform coating difficult due to high viscosity. In addition, when such a lubricant is applied to a magnetic recording medium, it disadvantageously produces sticking between the medium and a magnetic head which is a disadvantage.

Rf and Rf' may be either the same or different. For example, they are composed of a group consisting of one of the following groups repeated or two groups or more selected from the following groups and alternately or randomly combined with each other, to which end one selected from among fluorine (F—), a perfluoroalkyl group ($C_nF_{2n+1}$) and a perfluorooxyalkyl group ($C_nF_{2n+1}O$—), wherein n represents an integer, is bonded.

(1) —CF(CF$_3$)—CF$_2$—O—
(2) —CF$_2$—CF$_2$—CF$_2$—O—
(3) —CF$_2$—O—
(4) —CF$_2$—CF$_2$—O—
(5) —CFZCO—
(6) —CFZCOO—

The groups represented by the following formulae are preferable as Rf and Rf':

(1) Z—(C$_3$F$_6$O)$_p$—(CF$_2$O)$_q$—CFZCO—
(2) Z—(C$_3$F$_6$O)$_p$—(CF$_2$O)$_q$—CFZCOO—
wherein p=3 to 100, and q=0 to 30
(3) Z—(C$_2$F$_4$O)$_r$—(CF$_2$O)$_s$—CFZCO—
(4) Z—(C$_2$F$_4$O)$_r$—(CF$_2$O)$_s$—CFZCOO—
wherein r=10 to 250, and s=1 to 250

The end group Z is one selected from the group consisting of F—, CF$_3$—, C$_2$F$_5$—, CF$_3$O—, C$_2$F$_5$O— and C$_3$F$_7$O—. In Rf and Rf', it is not necessary that the hydrogen is completely substituted for by fluorine, and even with a low hydrogen content the lubricating properties are sufficient.

In the formula (I), n is 0 to 5. In other words, the number of the benzene rings contained in the compound represented by the formula (I) is 1 to 6. Although the bonding structure of a benzene ring may be any of ortho, meta, and para structures, the following structures are preferable:

In the case of having two benzene rings,

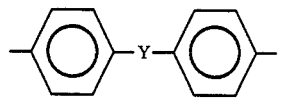

In the case of having three benzene rings or more,

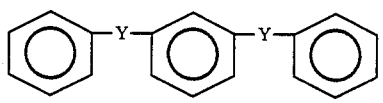

When three benzene rings or more are combined at the meta positions in this way, the compound becomes liquid, which is easy to handle.

A compound having seven benzene rings or more is impractical, because it is difficult to synthesize and difficult to dissolve in a common solvent.

X and X' in the formula (I) are a polar group. They are preferably —NH— or —COO—. X and X' may be either the same or different.

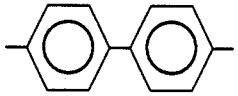

The structure where no Y group is present is also possible.

A compound represented by the formula (I) is produced, for example, by the following methods.

Synthesis 1

200 g (0.1 mol) of perfluoroalkyl polyether acid chloride [average molecular weight: 2,000 (measured by nuclear magnetic resonance analysis), formula: F(C$_3$F$_6$O)$_l$C$_2$F$_4$COCl (l is about 11), acid value: 32, viscosity: 90 centistokes at 38° C.] with 200 ml of perfluorodecalin (boiling point: 142° C.) added thereto as a solvent was charged into a 500-ml four-necked flask equipped with a reflux condenser, a thermometer and a stirrer and was mixed uniformly. While the solution was being stirred, 8 g (0.07 mol) of p-phenylene diamine dissolved in 100 ml of N-methyl-2-pyrrolidine was added dropwise slowly from the above to the solution in 10 minutes by using a separatory funnel. Thereafter the mixture was heated to 80° C. with a mantle heater and stirred for 5 hours. After cooling the solution, it was poured into a separatory funnel and a little diluted hydrochloric acid was added thereto. The unreacted amine salt and n-methyl-2-pyrrolidone were removed by repeatedly washing the mixture with water until the washing water became neutral. After the solution was dehydrated and dried with anhydrous sodium sulfate, it was refluxed for 1 hour more and the solvent was distilled off under vacuum to obtain an oily matter. As a result of IR spectral analysis, it was found that absorption of a secondary amide appeared at 1650 to 1660 cm$^{-1}$ in place of the absorption of carboxylic acid at 1780 cm$^{-1}$.

The oily matter was

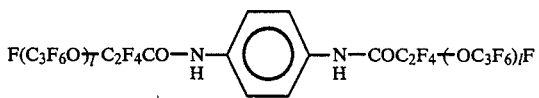

wherein l is about 11, and the average molecular weight of the fluorine-containing polyoxyalkylene group was about 1,970.

Synthesis 2

In the same way as in Synthesis 1, 200 g (0.08 mol) of perfluoroalkyl polyether acid chloride [average molecular weight: 2,500 (measured by nuclear magnetic resonance analysis), formula: F(C$_3$F$_6$O)$_l$C$_2$F$_4$COCl (l is about 14), acid value: 22, viscosity: 115 centistokes at 38° C.] with 200 ml of perfluorodecalin added thereto as a solvent was charged into a 500-ml four-necked flask and was mixed uniformly. While the solution was being stirred, 10 g (0.05 mol) of 4,4' diaminodiphenyl oxide (formula: H$_2$N—C$_6$H$_4$—O—C$_6$H$_4$—NH$_2$) dissolved in 100 ml of N-methyl-2-pyrrolidone was added dropwise to the solution in 10 minutes by using a separatory funnel. Thereafter the mixture was heated to 80° C. with a mantle heater and stirred for 5 hours. After cooling the solution, a water solution of diluted hydrochloric acid was added thereto. The unreacted amine salt and n-methyl-2-pyrrolidone were removed by repeatedly washing the mixture with water until the washing water became neutral. After the solution was dehydrated and dried with anhydrous sodium sulfate, it was refluxed for 1 hour more and the solvent was distilled off to obtain an oily matter. As a result of IR spectral analysis, it was found that absorption of a secondary amide appeared at 1650 to 1660 cm$^{-1}$ in place of the absorption of carboxylic acid at 1780 cm$^{-1}$.

The oily mater was

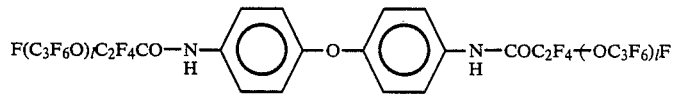

wherein l is about 14, and the average molecular weight of the fluorine-containing polyoxyalkylene group was about 2,470.

Synthesis 3

In the same way as in Syntheses 1 and 2, 200 g (0.10 mol) of perfluoroalkyl polyether acid chloride [average molecular weight: 2,000 (measured by nuclear magnetic resonance analysis), formula: F(C$_3$F$_6$O)$_l$C$_2$F$_4$COCl (l is about 11)] with 200 ml of perfluorodecalin added thereto as a solvent was charged into a 500-ml four-necked flask and was mixed uniformly. While the solution was being stirred, 15 g (0.054 mol) of 1,3 bis(3-aminophenoxy)benzene (formula:

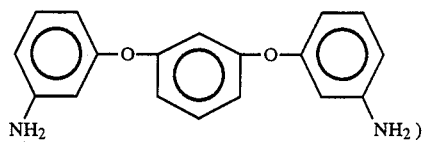

dissolved in 100 ml of N-methyl-2-pyrrolidone was added dropwise to the solution in 10 minutes by using a separatory funnel. Thereafter the mixture was heated to 80° C. with a mantle heater and stirred for 5 hours. After cooling the solution, it was poured into a separatory funnel, and a water solution of diluted hydrochloric acid was added thereto. The unreacted amine salt and n-methyl-2-pyrrolidone was removed by repeatedly washing the mixture with water until the washing water became neutral. After the solution was dehydrated and dried with anhydrous sodium sulfate, it was refluxed for 1 hour more and the solvent was distilled off to obtain a viscous matter. As a result of IR spectral analysis, it was found that absorption of a secondary amide had appeared at 1650 to 1660 cm$^{-1}$ in place of the absorption of carboxylic acid at 1780 cm$^{-1}$.

The viscous matter was

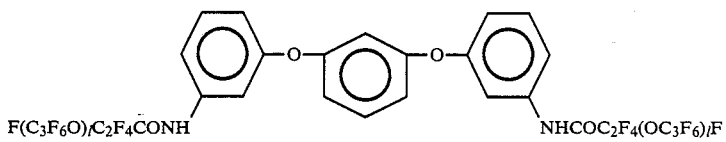

wherein l is about 11, and the average molecular weight of the fluorine-containing polyoxyalkylene group was about 1,970.

Synthesis 4

150 ml (0.075 mol) of perfluoroalkyl polyether carboxylic acid [average molecular weight: 2,000 (measured by nuclear magnetic resonance analysis), formula: F(C$_3$F$_6$O)$_n$C$_2$F$_4$COOH (n is about 11), acid value: 32] were added to 150 ml of perfluorodimethyl cyclohexane and they were uniformly mixed. In the solution, 150 ml of xylene dried with anhydrous sodium sulfate and 10 g (0.037 mol) of 4,4'-dihydroxydiphenyl-2,2-propane:

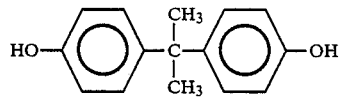

were dissolved. The thus-obtained solution and 0.05 g of p-toluene sulfonic acid were charged into a 500 ml flask with side arm equipped with a thermometer and a Gimroth condenser having a water test tube. The mixture was heated with a mantle heater and refluxed for 5 hours. The amount of extracted water in the water test tube was 1.2 ml, while the theoretical quantity was 1.39 ml. 100 ml of the solvent was distilled off. After cooling, the solution was washed with water until the washing water became neutral. The solution was dried with anhydrous sodium sulfate, and the solvent was distilled off under vacuum. The residue was washed with 100 ml of methyl isobutyl ketone 5 times to extract the unreacted 4,4'-dihydroxydiphenyl-2,2-propane, and a viscous matter was obtained. The acid value measured was 0.11. In IR spectral analysis, almost no absorption was observed at 3400 cm$^{-1}$, carboxylic acid showed a slight peak at 3,000 and 1780 cm$^{-1}$, and large absorption of ester appeared at 1735 cm$^{-1}$.

The viscous matter was

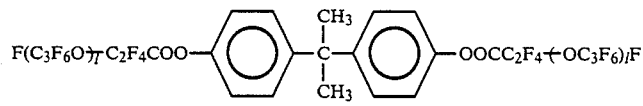

wherein l is about 11, and the average molecular weight of the fluorine-containing polyoxyalkylene group was about 1,990.

These synthetic lubricants for lubricating a thin film of the present invention are very effective as a lubricant for coating a thin film magnetic recording medium for high-density recording or the like. They form a lubricant film of one to several molecular layers thick.

When coating, a lubricant of the present invention is preferably dissolved in a solvent such as trichlorotrifluoroethane so that the concentration of the compound represented by the formula (I) is about 0.01 to 0.02 vol%.

A magnetic recording medium which is to be coated with a lubricant of the present invention is composed of a hard discal substrate, and at least a magnetic recording layer and a protective film layer for covering the magnetic recording layer formed thereon. The substrate is made of any given material such as aluminum, aluminum alloy, ceramic and glass. A hard film of chromium, Ni-P, Ni-Cu-P, anodized aluminum or the like is formed on the substrate, if necessary. As the magnetic recording layer, various kinds of magnetic layers may be adopted, for example, Co, Co-Ni, Co-Ni-Cr, Co-Ni-Pt, Co-Ni-P, and Co-Pt. As the protective film layer, carbon and/or silicon oxide are preferable and, above all, graphite or amorphous carbon is more preferable.

A compound represented by the general formula (I) and contained in a synthetic lubricant for lubricating a thin film according to the present invention has 1 to 6 benzene rings at the substantially central portion of the bonding chain. The benzene ring has a diameter of about 5 Å, and has $\pi$ electrons which allow the lubricant to firmly adhere to the surface of a metal, carbon or silicon oxide and to have a large bonding area. The central portion of the compound is absorbed to the surface of a metal or the like by electrons, as described above, and the Rf and Rf' groups at both ends thereof reach the positions far from the surface, the Rf and Rf' groups producing a good lubricating effect. A compound having ether linked-oxygen between benzene rings has a better thermal stability.

A synthetic lubricant for lubricating a thin film therefore has not only excellent lubricating properties but also very high durability and adsorptivity. A lubricant of the present invention is very effective for forming a lubricating film on a high-density magnetic recording medium and the like, and a magnetic recording medium with such a lubricant adhered to the surface thereof exhibits very excellent resistance to CSS and desirable migrating characteristic.

Examples and comparative examples will be shown in the following.

EXAMPLES 1 TO 3

Aluminum substrate disks of 5¼" diameter were produced by each of the following methods (1) to (5). The surfaces of the thin film disks with carbon protective films formed thereon were uniformly coated with later-described compounds which had been diluted to 0.01 vol% with trichlorotrifluoroethane by spraying so as to form lubricant films. The properties of the lubricant films were tested. The results are shown in Table 1.

Producing Method (1) An aluminum substrate subjected to anodization treatment was treated with polished texture to obtain a substrate having an average surface roughness Ra of 0.02 μm. A sputtered film of CoNiCr (13 at% of Ni, 3 at% of Cr and the balance Co) was formed into a thickness of 1,000 Å on the thus-obtained substrate in an argon atmosphere containing nitrogen. A carbon protective film was formed thereon into a thickness of 200 Å by DC sputtering. The thus-obtained medium was then subjected to heat treatment in vacuum at 340° C. for 2 hours to obtain a magnetic disk.

(2) An aluminum substrate with a chromium underlayer of 2,000 Å thick formed thereon by sputtering was treated with polished texture to obtain a substrate having an average surface roughness Ra of 0.02 μm. A sputtered film of CoNiCr (13 at% of Ni, 3 at% of Cr and the balance Co) was formed into a thickness of 800 Å on the substrate in an argon atmosphere containing nitrogen. A carbon protective film was formed thereon into a thickness of 200 Å by DC sputtering to obtain a magnetic disk.

(3) An aluminum substrate plate with NiP was treated with polished texture to obtain a substrate having an average surface roughness Ra of 0.02 μm. A sputtered film of CoNiPt (15 at% of Ni, 7 at% of Pt and the balance Co) was formed into a thickness of 800 Å on the substrate in an argon atmosphere. A carbon protective film was formed thereon into a thickness of 200 Å by DC sputtering to obtain a magnetic disk.

(4) On the substrate obtained in the same way as in the method (3), a CoNiPt film (15 at% of Ni, 7 at% of Pt and the balance Co) was formed into a thickness of 800 Å by plating. A carbon protective film was formed thereon into a thickness of 200 Å by DC sputtering to obtain a magnetic disk.

(5) On the substrate obtained in the same way as in the method (1), a sputtered Fe$_3$O$_4$ film containing Co was formed by RF sputtering. The thus-obtained medium was then subjected to heat treatment in an atmosphere at 320° C. for 2 hours to obtain a γ-Fe$_2$O$_3$ film of 1,500 Å thick. A carbon protective film was formed thereon into a thickness of 200 Å by DC sputtering to obtain a magnetic disk.

Compound for a lubricant

EXAMPLE 1

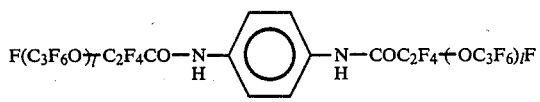

obtained by Synthesis 1, wherein l is about 11 and the average molecular weight of the perfluoropolyoxyalkylene group is about 1,970.

EXAMPLE 2

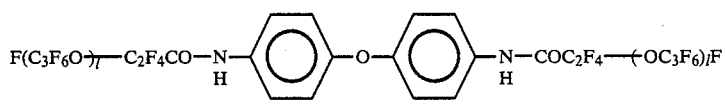

obtained by Synthesis 2, wherein l is about 14 and the average molecular weight of the perfluoropolyoxyalkylene group is about 2,470.

EXAMPLE 3

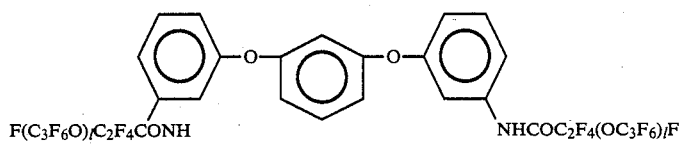

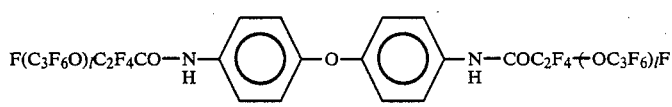

obtained by Synthesis 3, wherein l is about 11 and the average molecular weight of the perfluoropolyoxyalkylene group is about 1,970.

The properties of the lubricant films were tested in the following way:

Resistance to CSS

The resistance to CSS was examined by the number of times of CSS repeated until the head was stuck or crushed by using a mini-winchester head of MnZn ferrite under the following conditions: flying height $hf=0.3$ μm, 3,600 rpm, and an on-off cycle of 15 sec (15-sec on and 15-sec off).

Migrating characteristics

The thickness of the lubricant film was measured at a point of R (radius)=50 mm before driving and after one-month continuous driving at 3,600 rpm by FTIR (Fourier transformed infrared spectrophotometry). The migrating characteristic was represented by the reduction ratio (%) of film thickness after driving with respect to the film thickness before driving.

COMPARATIVE EXAMPLES 1 TO 4

Lubricant films were formed in the same way as in Example 1 except that the following compounds which had been diluted to 0.02 vol% with trichlorotrifluoroethane were spray coated as the lubricants. The properties of the lubricant films were tested. The results are shown in Table 1.

COMPARATIVE EXAMPLE 1

Fomblin Z-25 (produced by Montedison, molecular weight: 15,000)

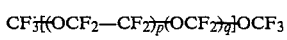

wherein p/q=50/1

COMPARATIVE EXAMPLE 2

Fomblin YR (produced by Montedison, molecular weight: 6,500)

COMPARATIVE EXAMPLE 3

Krytox 143 AC (produced by Du Pont, molecular weight: 6,500)

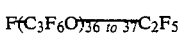

COMPARATIVE EXAMPLE 4

Krytox 157 FS-M (produced by Du Pont, molecular weight: 4,500)

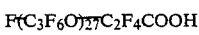

TABLE 1

| Example Disk No. | Resistance to CSS (Kilo cycles) | | | | | Migrating Characteristics (%) | | | | |
|---|---|---|---|---|---|---|---|---|---|---|
| | 1 | 2 | 3 | 4 | 5 | 1 | 2 | 3 | 4 | 5 |
| Example | | | | | | | | | | |
| 1 | 45 | 55 | 70 | 60 | 80 | <10 | <10 | <10 | <10 | <10 |
| 2 | 50 | 60 | 75 | 65 | 100 | <10 | <10 | <10 | <10 | <10 |

TABLE 1-continued

| Example Disk No. | Resistance to CSS (Kilo cycles) | | | | | Migrating Characteristics (%) | | | | |
|---|---|---|---|---|---|---|---|---|---|---|
| | 1 | 2 | 3 | 4 | 5 | 1 | 2 | 3 | 4 | 5 |
| 3 | 45 | 55 | 70 | 63 | 80 | <10 | <10 | <10 | <10 | <10 |
| Comparative Example | | | | | | | | | | |
| 1 | 20 | 19 | 18 | 15 | 18 | 20 | 30 | 35 | 30 | 30 |
| 2 | 10 | 11 | 13 | 10 | 12 | 70 | 60 | 70 | 70 | 60 |
| 3 | 10 | 14 | 13 | 11 | 17 | 50 | 35 | 40 | 45 | 40 |
| 4 | 18 | 20 | 20 | 15 | 17 | 30 | 20 | 35 | 30 | 30 |

As is clear from Table 1, in any disk using a lubricant of the present invention, the resistance to CSS is as high as 45 to 100 kilo cycles, and the reduction ratio of the film thickness after the migrating characteristic test is as small as 10% or less. Thus, it has been proved that a lubricant of the present invention has a strong absorptivity with respect to a carbon protective film.

On the other hand, in the conventional lubricants in Comparative Examples 1 to 4, the resistance of CSS is as low as 10 to 20 kilo cycles, and the reduction ratio of the film thickness after the migrating characteristic test is as large as 20 to 50%. Thus, it has been proved that the adsorptivities of these lubricants with respect to a carbon protective film are very low. This is considered to be because the resistance to CSS is inferior due to a large amount of migration in spite of a large molecular weight.

Although the above experiments were conducted with a carbon protective layer, the lubricant of the present invention was proved to have a strong adsorptivity to silicon oxide, glass and metal as well.

Accordingly, it is clear that the lubricant of the present invention has much higher resistance to CSS, more desirable migrating characteristic and better lubricating properties than the conventional ones, and that it can sufficiently meet the properties required of a thin film magnetic disk.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A magnetic recording medium having a substrate with at least a magnetic recording layer and a protective film layer for covering said magnetic recording layer formed thereon, said magnetic recording medium comprising a lubricant layer formed on said protective film layer by coating said protective film with a lubricant containing a compound represented by the following general formula (I):

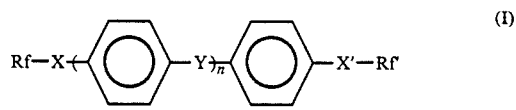

wherein Rf and Rf' represent a fluorine-containing polyoxyalkylene group, X and X' a polar group Y of one or more selected from the group consisting of methylene, ethylene, propylene, oxygen, ketone, imino, sulfone and sulfur or no atom or group, and n an integer of 0 to 5, wherein the thickness of said lubricant layer of a compound represented by the general formula (I) is one to several molecular layers.

2. A magnetic recording medium according to claim 1, wherein said lubricant layer is formed by coating said protective film layer with a coating fluid containing 0.01 to 0.02 vol% of a compound represented by the general formula (I).

3. A magnetic recording medium according to claim 1, wherein said substrate is made of aluminum, aluminum alloy, ceramic or glass.

4. A magnetic recording medium according to claim 1, wherein a hard film is formed on said substrate, wherein said hard film is a film of chromium, Ni-P, Ni-Cu-P or anodized aluminum.

5. A magnetic recording medium according to claim 1, wherein said magnetic recording layer is made of Co, Co-Ni, Co-Ni-Cr, Co-Ni-Pt, Co-Ni-P or Co-Pt.

6. A magnetic recording medium according to claim 1, wherein said protective film layer is made of carbon.

7. A magnetic recording medium according to claim 6, wherein said protective film layer is made of graphite carbon or amorphous carbon.

* * * * *